June 1, 1954

A. L. VINTENON 2,680,202

CURRENT SUPPLY AND STARTING METHOD AND UNIT, NOTABLY
FOR AIRCRAFT PROPULSED BY TURBOMACHINES
OR RECIPROCATING ENGINES

Filed Oct. 17, 1952

INVENTOR
ANDRE LOUIS VINTENON
By Haseltine, Lake & Co.
AGENTS

INVENTOR
ANDRE LOUIS VINTENON
BY Haseltine, Lake & Co.
AGENTS

June 1, 1954

A. L. VINTENON 2,680,202

CURRENT SUPPLY AND STARTING METHOD AND UNIT, NOTABLY
FOR AIRCRAFT PROPULSED BY TURBOMACHINES
OR RECIPROCATING ENGINES

Filed Oct. 17, 1952

INVENTOR
ANDRE LOUIS VINTENON
BY
Haseltine, Lake & Co.
AGENTS

Patented June 1, 1954

2,680,202

UNITED STATES PATENT OFFICE 2,680,202

CURRENT SUPPLY AND STARTING METHOD AND UNIT, NOTABLY FOR AIRCRAFT PROPULSED BY TURBOMACHINES OR RECIPROCATING ENGINES

André Louis Vintenon, Bois-Colombes, France, assignor to Electrom, Neuilly-sur-Seine, Seine, France Application October 17, 1952, Serial No. 315,294

12 Claims. (Cl. 290—4)

Modern aircrafts are equipped with a number of electric auxiliaries, such as radio, radar, pump motors, compressor motors, etc., in addition to the electric starter of the propulsing engine or engines.

The current supply of the electric starter, specially in aircrafts provided with turbo-machines, has characteristics quite different from those of the other circuits. While these latter circuits must be fed under a constant voltage and absorb but a small power, the starter requires for itself alone a power supply twice to three times as high as all the other circuits together and owing to its particular function, the current absorbed must be regulated in order to avoid peaks which would be detrimental to the electrical and mechanical behaviour of the equipment.

The current supply and starting unit must therefore have such characteristics as to comply with both the following contradictory conditions: the power of the engine driving the generator must be so selected as to permit the heavy current supply required for starting and the regulation of the dynamo must maintain the supply voltage constant and equal to its rated value when feeding the circuits other than the starting circuit and, on the contrary, must maintain a constant intensity during the starting operation.

The driving engine, usually a gasoline or a diesel engine, must be able to supply the power required by the generator for starting and, to keep the weight and the volume of the unit within proper limits, it is convenient to select an engine adapted to supply the required power at a speed approaching the maximum running speed of the engine, for instance 80% of the latter, since the starting time is very short, say about half a minute. When not for starting, the engine is used with a reduced power but the high speed selected results in a poor efficiency and short life.

The generator for supplying the current to the aircraft is not particularly difficult to be designed with a given weight and volume, as electric machines easily support very high power peaks of short duration.

But the regulation is much more difficult owing to the particular characteristics required for a proper feed of the starter. Experience has shown that the latter must be effected at a constant intensity and with an increasing voltage to ensure the acceleration of the started engine in the best conditions, specially in the case of turbo-machines.

It is therefore necessary that upon closing of the starter feeding contactor, an intensity regulation be substituted to the voltage regulation and that this change should occur almost instantaneously, the resistance and the self-inductance of the starter circuit being very small.

The conventional voltage and current control of the dynamo by two regulators does not give good results, at least in the transitory period immediately following the closing of the starter contactor, because of the value of the time-constant of the regulators. This is due to the fact that the voltage regulator which was set on the rated voltage must then give way to the current regulator which was inoperative before since the powers required for the other circuits are much smaller than that required for starting. The result thereof is a current peak at the beginning of the start, which is dangerous for the starter.

More or less complicated devices have been designed for the purpose of eliminating the above drawbacks by giving the voltage and current regulators a proper time-constant. But these devices, in addition to being complicated and consequently costly, do not completely eliminate all these drawbacks.

In order to remove these drawbacks, the present invention has for its object a current supply and starting method, more particularly for the service on ground of aircrafts equipped with turbo-machines or reciprocating engines, by means of a starting generator driven by a starting engine, according to which method the starting engine is run during the current supply periods at a speed lower than the speed corresponding to the power required for starting and the voltage of the current supplied by the generator during said periods is maintained at a constant value and, at the time of starting, the starting engine is run at the speed corresponding to the power required for starting, the intensity of the current supplied by the generator is maintained at the value required for starting and, after the counter electromotive force of the starter has reached its rated value, the current supply voltage is controlled to be equal to the above mentioned constant value of the voltage. The shift of the starting engine from the reduced speed to the starting speed is caused by the current intensity passing from the supply value to the starting value.

A further object of the invention is to provide a current supply and starting unit adapted to carry out the method specified above, said unit being constituted by a starting engine having a speed adjusting device, such as a governor, adapted to be set on two different speeds coupled with a starting generator, said generator being associated with a regulating device comprising a general regulator inserted in the circuit of ex-citation which in the current supply condition is submitted to the action of a voltage pilot regulator and, under starting load, is submitted first to the action of an intensity pilot regulator and then to the action of the voltage pilot regulator, the speed governor of the starting engine passing from one of its settings to the other by means of an electric control effected by a servo-motor.

The speed governor, according to an advantageous embodiment, comprises a spring adapted to be submitted to two different tension loads by a solenoid the plunger of which acts on the set end of the spring, said solenoid being energized when an auxiliary circuit is completed by the closing of the main starting contactor of the unit. The closing of the auxiliary solenoid feed circuit may conveniently be effected through an intensity relay the coil of which is connected in series in the line and the contactor of which when closing energizes the solenoid coil, said relay being so adjusted as to remain open as long as the intensity of the supply current does exceed the value which corresponds to the long-running power of the unit. During the starting operation, said relay when closing energizes the servo-control of the engine governor which, by loading the governor spring, causes the governed speed of said engine to change to a greater value.

The generator is preferably shunt wound or slightly compounded so that, at the lower governed speed of the unit, it generates with the full field the required current output, under the rated voltage.

According to an advantageous embodiment, the regulating set comprises a main carbon pile regulator controlled by two vibrating pilot regulators, namely a shunt coil voltage regulator connected between the line terminals, and a series coil intensity regulator traversed by the line current. The voltage pilot regulator is set at the rated voltage, while the intensity pilot regulator is set at the current value which is to be maintained constant during the starting period (two or three times the intensity of the supply periods). The coil of the intensity regulator may be fed from a shunt. Several intensity adjustments may thus be obtained by means of a switch connecting the coil to different tappings of the shunt or by inserting, between the shunt and the winding, resistors corresponding to different adjustments.

Other features of the invention will be apparent in the following description made with reference to the accompanying drawings and which will make it well understood how the invention may be carried into practice, the features of the described devices being of course included in the scope of the invention.

Figure 1:
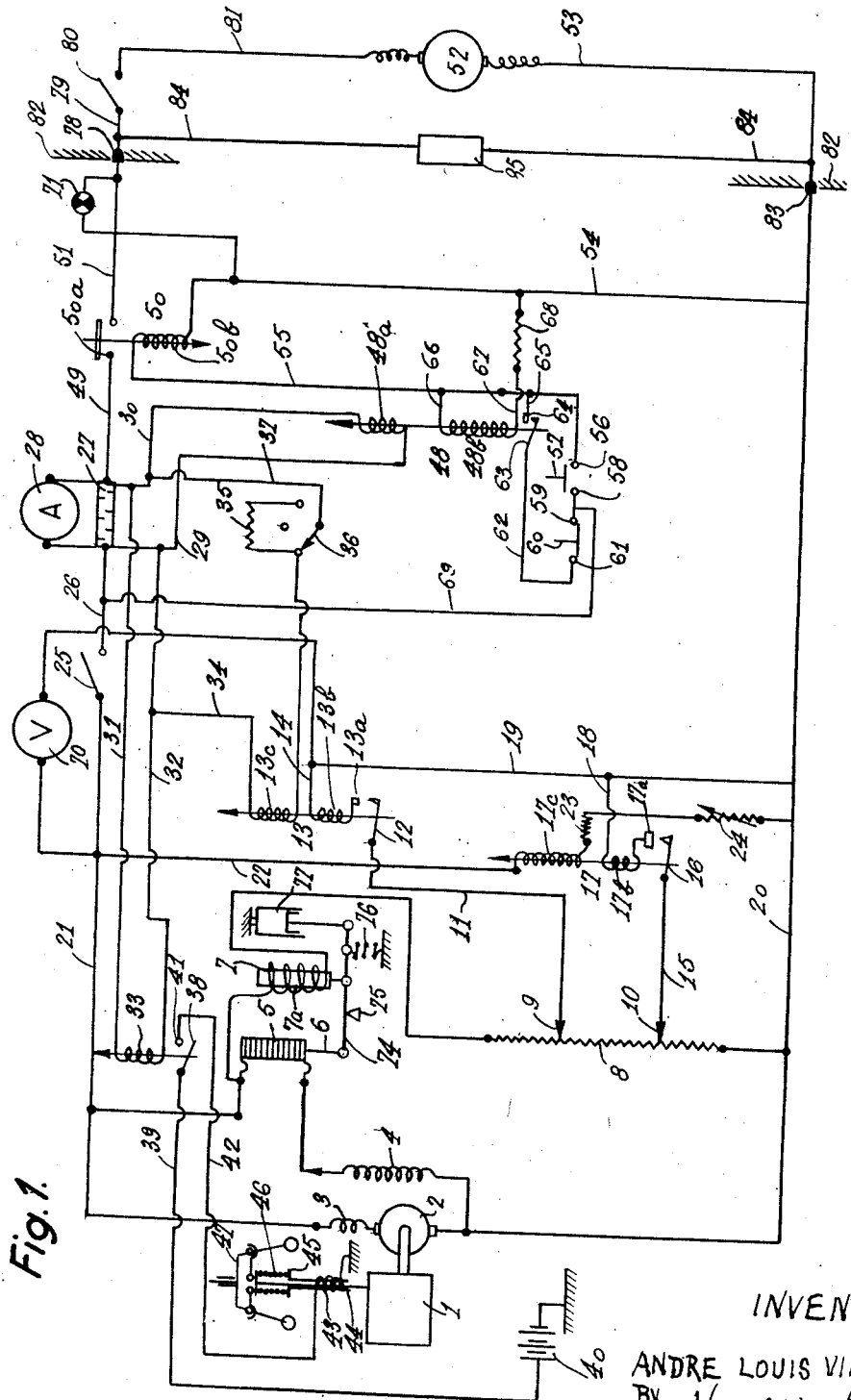
Figure 1 is a general diagram of an electric supply and starting unit according to the invention, wherein the winding of the intensity regulator is fed through resistances corresponding to various current adjustments.
Figure 2:
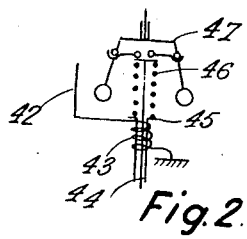
Figure 2 shows the position of the starting engine governor spring during starting.

The installation comprises an internal combustion starting engine 1 mechanically connected to drive a starting electric generator 2, the armature of which is connected in series with a coil 3 for compound excitation. The shunt field coil 4 of generator 2 is connected to one pole thereof directly and to the other pole through a pile 5 of carbon discs forming the main regulator. Said pile 5 is pressed or released by a member 6 carried by a lever 74 pivoting about point 75 and which is connected with the armature 7a of a solenoid the coil 7 of which is in series with a calibrating multiple tap resistor 8 in a circuit connected in parallel with said generator 2. In the inoperative condition a spring 76 presses the pile 5 through lever 74. The compression and release action is regularized by a damping dash-pot 77.

The calibrating resistor 8 has two tappings 9, 10 for feeding voltage and intensity pilot vibrators. The tapping 9 is connected to a wire 11 which leads to the vibrating member 12 of the intensity pilot regulator 13. The stationary contact 13a of the intensity pilot regulator 13 is connected to one end of a quick-break winding 13b, the other end of which is connected to the wire 14.

The tapping 10 of the calibrating resistor 8 is connected through a wire 15 to the vibrating member 16 of a pilot voltage regulator 17. The stationary contact of said regulator is connected to one end of the quick-break winding 17b the other end of which is connected through a wire 18 to a wire 19 connected to the wire 14 and to the outlet line 20 of generator 2.

The second outlet line 21 of generator 2 to which is connected the pile 5 of the main regulator is connected through a wire 22 to the operative coil 17c of the voltage pilot regulator 17, the other end of said operative coil 17c being connected to line 20 through a resistor 23 and a voltage adjusting rheostat 24.

The outlet line 21 of generator 2 comprises a hand-operated isolator connected on the outlet side to the line 26 leading to a shunt 27. Across this shunt are connected, on one hand, an ammeter 28 and, on the other hand, two lines 29 and 30. From these lines are respectively branching two wires 32 and 31 between which is connected the coil 33 of an intensity relay. From wire 32 branches a wire 34 leading to one end of the operative coil 13c of the intensity pilot regulator 13, the other end of which coil is connected to a multiple tap rheostat 35 the slider 36 of which is connected through wire 37 to line 30.

The winding of the intensity relay 33 is associated with a movable contact 38 normally open which is connected to a wire 39 leading to the positive pole of a storage battery 40 the negative pole of which is earthed. The stationary contact 41 of the intensity relay is connected by a wire 42 to one end of a coil 43 the other end of which is connected to earth. The core 44 associated to coil 43 is provided with a flange 45 constituting the adjustable fixed bearing of the spring 46 of a governor 47 rotated by the combustion engine 1.

Lines 29, 30 feed the series winding 48a of a reverse current relay 48. On the other hand, the main line is prolonged beyond shunt 27 by a line 49 leading to the stationary contact 50a of a main starting contactor 50. Beyond said main contactor 50 branches off a wire 51 removably connected to the terminal 78 of the aircraft 82, which terminal is connected to the line 79 in which is inserted a switch 80 the stationary contact 81 of which is connected to the feeding wire 89 of the series wound starter 52 of the combustion engine to be started. This starter 52 is connected on the other side through a wire 53 to the terminal 83 of aircraft 82 to which terminal line 20 is removably connected. Between lines 79 and 53 is connected the circuit 84 which supplies the current to auxiliaries 85, such as radio, radar, pump motors, etc.

The coil 50b of the main contactor 50 is connected at one end through a wire 54 to line 20. The other end of said coil 50b is connected through a wire 55 to the stationary contact 56 of a normally open push-button switch 57 the other stationary contact 58 of which is connected to the stationary contact 59 of a normally closed push-button switch 60. The other stationary contact 61 of the normally closed push-button switch 60 is connected through a wire 62 to the movable contact 63 of the reverse current relay. The stationary contact 64 of said relay is connected through a wire 65 to wire 55, while its shunt winding 48b is connected between same wire 55 through a wire 66 and wire 54 through a wire 67 and a calibrating resistor 68. A lead 69 connects line 26 to the stationary contacts 58 and 59. Moreover, a voltmeter 70 is connected between line 21 and wire 19, while a signal lamp 71 is connected between wire 51 and wire 54.

The above described arrangement operates as follows:

With the unit running, lines 51 and 20 connected to terminals 78 and 83 and isolator 25 closed, if the push-button 57 is depressed the coil 50b of the main contactor 50 will be fed through the following circuit: line 21—isolator 25—line 26—wire 69—contact 58—push-button switch 57—contact 56—wire 55— coil 50b—wire 54—line 20. The movable contact of the main contactor then closes, whereby the line 84 is fed. At the same time, the shunt coil 48b of the reverse current relay connected between wires 54 and 55 and the series coil 48a of same relay are excited and the fields they produce add their actions so that the movable contact 63 engages the stationary contact 64 thereby maintaining the supply of the main contactor coil 50b when the push-button 57 is released.

At this time, engine 1 runs at the lower speed determined by the governor owing to the pressure exerted on spring 46 by the flange 45 of core 44. Said lower speed is maintained to a constant value under any load conditions between no load and the long-running power for which the unit is designed. The voltage of the supply is maintained to the constant value determined by the setting of the calibrating rheostat 24 through the voltage pilot regulator 17 which controls the main regulator coil 7 so that the pressure exerted by its armature 6 on the carbon pile 5 and consequently the electric resistance of said pile are such that the field coil current of the dynamo generates the electromotive force required to feed the circuit 84 of auxiliaries 85.

If the operator closes switch 80 to start the engine or engines of aircraft 82, the increased current drawn owing to the closing of said switch 80 has three simultaneous effects:

(a) The electromotive force of dynamo 2 drops, as the speed of the dynamo is too low for generating a very heavy current;

(b) The intensity pilot regulator 13 operates and periodically short-circuits, at the suitable frequency, the portion of calibrating resistor 8 which is comprised between wire 20 and tapping 9, so that the current through coil 7 will adjust the compression of carbon pile 5 through which the field coil 4 of the generator is fed to such a value that the intensity of the current supplied to starter 52 will be maintained to a constant value;

(c) The movable contact 38 of control intensity relay closes, its coil 33 of said relay being excited through circuit: line 30—wire 31—coil 33—wire 32—line 29.

The movable contact 38 engages the stationary contact 41 and the solenoid 43 is therefore excited by the current supplied from battery 40. The core 44 is then attracted and through its flange 45 displaces that end of spring 46 which is attached thereto, thereby causing the tension of said spring to increase and establishing a new adjustment of governor 47 which permits the combustion engine 1 to run at a greater speed.

However, the speed of engine 1 has first decreased owing to the increased power required by the dynamo 2, which, together with the armature reaction of the latter, limits the instantaneous current value, the shunt excitation being also reduced by the action of the intensity pilot regulator 13. Thereupon the governor operates and, as the tenison of its spring 46 is greater under the action of the servo control, the speed of the combustion engine is allowed to increase and reach the speed corresponding to the starting operation. The intensity of the current output of generator 2 is maintained to a constant value by the intensity pilot regulator 13 until the counter electromotive force of starter 52 reaches its rated value. During the acceleration of starter 52, the increase of said counter electromotive force would tend to cause the intensity to decrease, but the regulator 13 so acts on carbon pile 5 as to maintain a constant intensity.

When the counter electromotive force of the starter reaches the rated value, the voltage regulator 17 becomes operative and fixes a limit to the possible compression of the carbon pile 5 by periodically short-circuiting, at the suitable frequency, the portion of the calibrating resistor 8 comprised between tapping 10 and line 20. After the rated voltage is reached, the starting operation may continue with decreasing current intensity.

As the armature reaction of the shunt wound or slightly compounded dynamo 2 is almost instantaneous this reaction itself limits the current drawn and sufficient delay is given for the pilot regulators 13 and 17 to operate, since the time-constant of these vibrating pilot regulators is very small. Said current-limiting effect is reinforced by the natural reaction of the combustion engine 1 which cannot maintain its speed when the resisting torque is suddenly increased. As the constant intensity is established after a very short delay, such as 1/5 or 1/6 of a second, and the supply voltage having dropped to one third or one half of its initial value, the combustion engine 1 will speed up normally, since the instantaneous power absorbed at this moment is not very different from the normal power at the lower governed speed.

As starter 52 begins to drive the turbo-machine, the generator of aircraft 82 which is mechanically connected to said starter, is also driven. If starter 52 is a starting-generating dynamo, as is generally the case, it will produce a current in the reverse direction of the current supplied by generator 2 to said starting-generating dynamo. In such an occurrence, the series coil 48a of the reverse current relay 48 will be energized in the reverse direction and the field thus produced will subtract its effect from that of the field produced by the shunt coil 48b thereby causing the movable contact 63 to open and the coil 50b of main contactor 50 to be deenergized, so that the supply of starter 52 will be cut off.

Said supply may also be cut off, if no reverse current has occurred, by depressing the push-button 60.

Such a starting arrangement may in the practice be applied to any existing starters. The suitable constant current value can be determined by the sole condition that the heat losses be the same as in the case of a constant voltage supply. As most of the losses are caused by Joule effect in the starter windings, the constant intensity which will produce the same heat losses by Joule effect as the variable intensity of the constant voltage supply in the same total time is easily calculated by integrating the heat function deduced from the curve of said variable intensity plotted against time.

The increased power does not prejudice the starter, the heating of which is the same, if not even less.

The starter has an easier operation due to the elimination of high current peaks. As the power increases progressively, damages to the starter collector and to the movable members of the connections are avoided. Furthermore, the operating time of the starter is reduced since the speed increases more rapidly and consequently the ignition of the jet engine is more quickly obtained. The starter heating limitations could actually be made still wider and the constant current could be chosen greater than specified above, the starting time being further reduced accordingly.

The starting unit conveniently comprises an explosion engine driving a forced ventilation type generator by means of a flexible coupling, the unit being mounted on a chassis carrying also a control switchboard, a fuel tank and an auxiliary battery for starting the engine of the unit.

It may be noted that the operation of such a starting unit is adapted to suit various conditions of utilization, according to the quicker or slower acceleration of the started engine in different temperature or altitude conditions. The self-regulation by the starter itself cooperating with the intensity and voltage pilot regulators will give the same results in any case.

Figure 3:
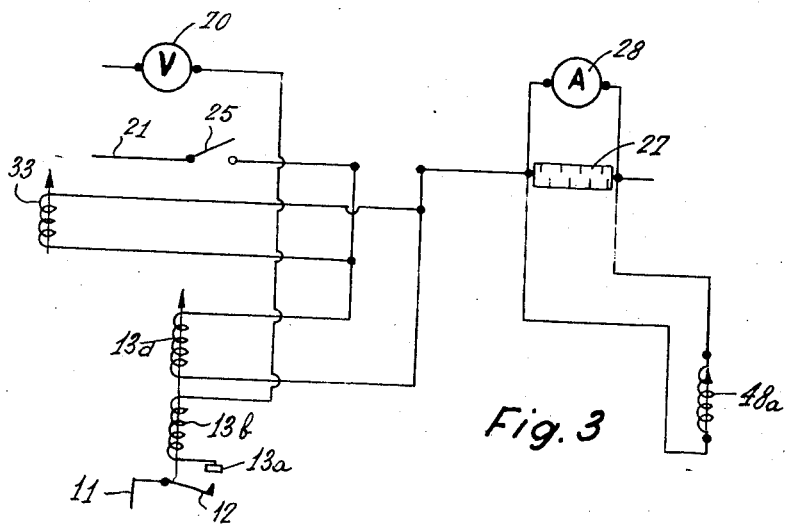
Figure 3 shows an alternative of a portion of the diagram illustrated in Figure 1, wherein the winding of the intensity regulator is inserted directly in the line.
Figure 4:
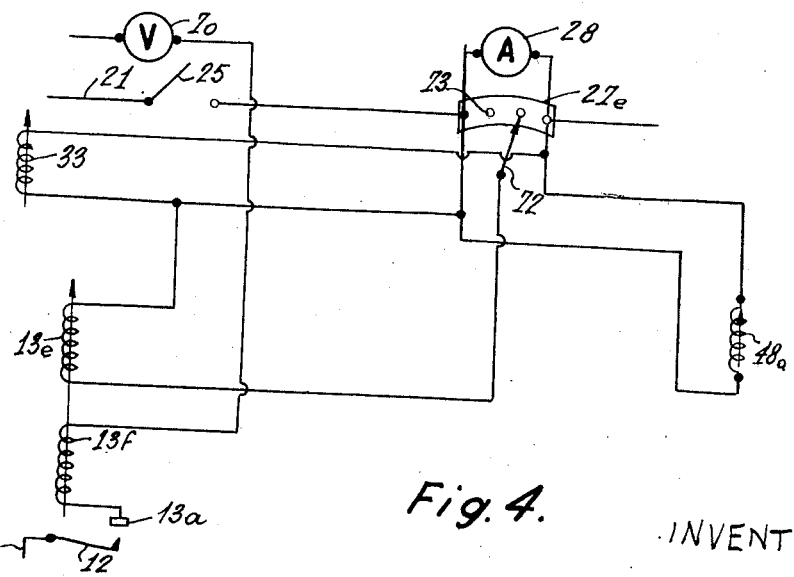
Figure 4 shows a second alternative of a part of the diagram illustrated in Figure 1, wherein the winding of the intensity regulator is fed from a multiple tap shunt.

The compensating coil of the relay may be directly inserted in the outlet line of the generator 2, as shown at 13d in Fig. 3. As shown at 13e in Fig. 4, this coil may also be fed from a shunt 27e, different adjustments of the intensity being obtained by means of a switch 72 which connects coil 13e to different tappings 73 of shunt 27c.

Of course, without departing from the scope of the invention, modifications could be made to the above described arrangements.

Figure 5:
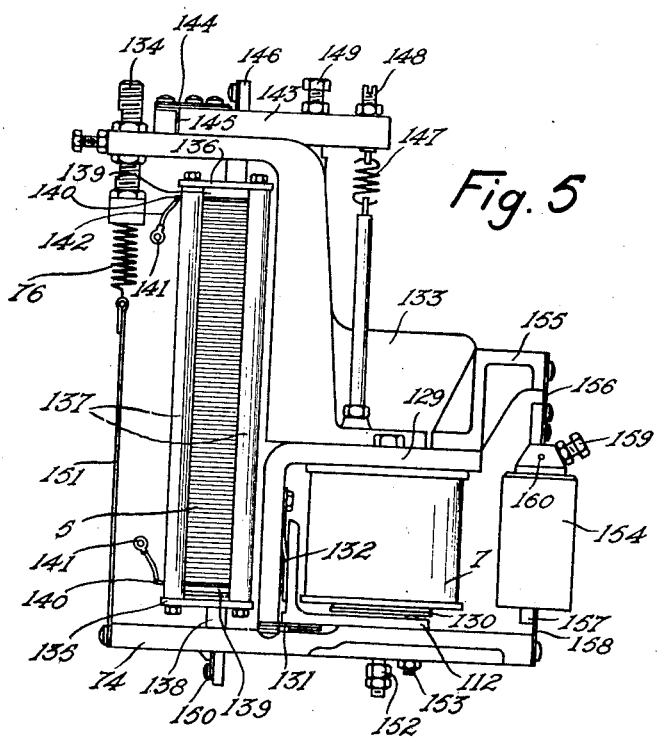
Figure 5 is an elevational view of a regulator designed according to the diagram of Figure 1.
Figure 6:
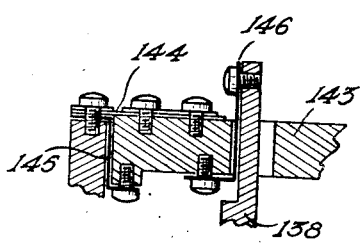
Figure 6 is a partial sectional view of the connecting means of the upper pile plate of the device illustrated in Figure 5.
Figure 7:
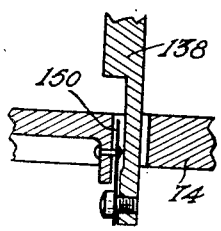
Figure 7 is a partial sectional view of the suspension means of the pressure lever of the device illustrated in Figure 5.
Figure 8:
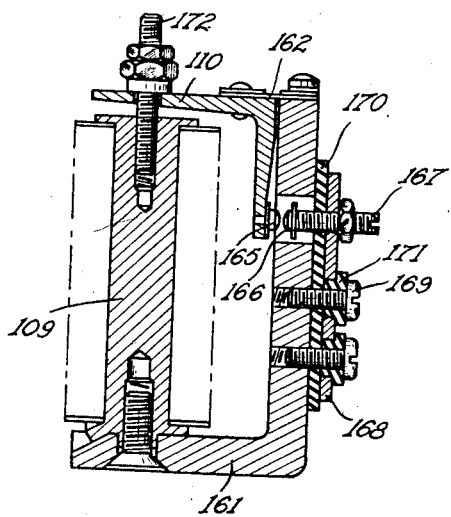
Figure 8 is a sectional view on the line VIII—VIII of Figure 10 of a vibrator with normally open contact, adapted to control the device illustrated in Figure 5.

Figs. 5 and 8 show, respectively, the construction of the pressure release device of a pile and the construction of a control vibrator in the case of an arrangement according to the diagram of Fig. 1.

In Figs. 5 to 7, 129 is the right angle frame of the solenoid, of which 130 is the core, 112 the armature and 7 the coil; 131 and 132 are strip springs providing an armature articulation without play.

The solenoid assembly is mounted on the supporting frame 133 which provides the fixed bearing of the carbon pile 5 and of the spring 76 which latter is adjustable by means of a screw 134.

The carbon pile 5 is housed in a conventional cage constituted by two plates 135, 136 and insulated spacers 137. Pile 5 is insulated from the upper plate 136 and from the bottom pusher 138 by discs 139 in steatite or other convenient insulating material; the current reaches the pile through silver discs 140 which are connected to the terminals 141 by flexible connections 142.

The upper plate 136 of the pile is connected to frame 133 through a lever 143 fulcrumed on the frame by means of elastic strips 144, 145 which permit the light required oscillation of the lever without any vertical play.

Plate 136 is connected to lever 143 by a strip spring 146. The lever is urged downwards by a spring 147 adjustable by means of the screw 148, and its downward travel is limited by the stop screw 149.

The pusher 138 of the pile is attached to lever 74 which is in turn secured to the armature 112 by a strip spring 150. The spring 76 which counter-acts the magnetic force is connected by the strip spring 151 to lever 74, the downward travel of which is limited by the stop 152 and the upward travel by the stop 153.

The damping means comprises an air dash-pot the cylinder 154 of which is secured at its upper end to a bracket 155 through the strip spring 156 and the piston 157 of which is connected to lever 74 by a strip spring 158.

The damping action is adjusted by more or less restricting the outlet or inlet of the air into or out of the space comprised between the piston and the cylinder through the needle valve 159 and the discharge vent 160.

The operation is as follows:

At rest the armature 112 is at the maximum air-gap position, the lever 74 fastened to it having pivoted about the point 75, which is materialized by the strip springs 131, 132, under the action of spring 76 until the lever has engaged stop 152.

This movement has caused the pile pressing pusher 138 to rise and compress the pile. The compression is however limited by the upward movement of the upper lever 143 the load of which is adjusted by means of spring 147. The general adjustment is such that in the rest position the stop 149 slightly disengages its fixed abutment, by 0.02 in. for example. This provides for an automatic take up of the play which compensates an eventual shortening of pile 5 by wear and for an always equal initial compression of said pile.

When the current passing through coil 7 is sufficient to produce a magnetic force that is able to overcome the reaction of spring 76, the lever 74 pivots and thereby causes the pile pusher 138 to move downwards. In the first part of this movement, the assembly of the pile and its cage moves downwards until lever 143 and with it the pile end plate 136 are stopped by the engagement of the stop 149 and the frame.

After the pile end plate is stopped, the further downward movement of pusher 138 constitutes the operative travel for the release of the pile; this travel is limited by the stop 153 of lever 74 engaging core 130.

It may be seen that such construction is very simple and does not require any special tools or any special materials.

Figure 9:
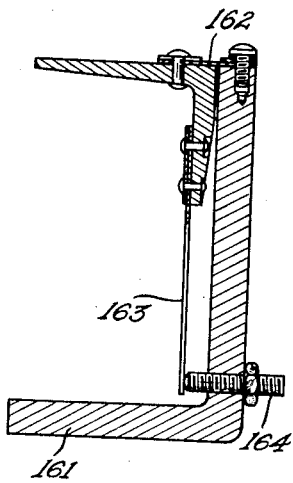
Figure 9 is a section taken on line IX—IX of Figure 10.
Figure 10:
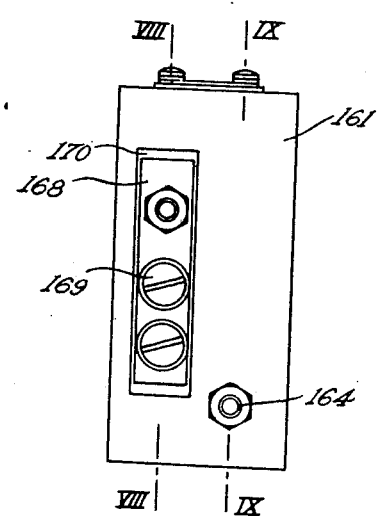
Figure 10 is a front view of the vibrator illustrated in Figure 8.

Figs. 8 to 10 show the construction of a vibrator to control the above described apparatus, such as the vibrator of the intensity and voltage pilot regulators 13 and 17. This vibrator comprises a fixed magnetic circuit 161 having the form of a right angle, a cylindrical coil core 109 (quick-break coil 13b or 17b of Fig. 1) and an armature 110 having also the form of a right angle and assuming the function of the vibrating moving members 12 or 16 (Fig. 1). These three members are made of Swedish iron, or any other material having a low remanence.

The armature 110 is pivotally secured to the fixed circuit 161 through a strip spring 162. On the other hand, the armature is urged to the maximum air-gap position by the strip spring 163 which engages an adjustable stop 164 screwed in the angle 161. Armature 110 also carries a contact piece 165 in tungsten or similar material adapted to engage, when the armature pivots to the minimum air-gap position, a contact piece 166 of same material assuming the function of the stationary contact 13a or 17a (Fig. 1) and carried by an adjustment screw 167 threaded in the contact block 168 which is secured to angle 171 by screws 169 and insulated from said angle by an insulating plate 170 and insulating bushes 171. The contact piece and the screw pass through a hole provided in angle 161.

The opening travel of the armature 110 is limited by an adjustable stop 172 and the closing travel by the stationary contact piece 166 and its supporting screw 167, whereby the extent of the travel may be adjusted so as to obtain a vibrating operation under the action of the flux produced by the coil or coils wound about core 109.

What I claim is:

1. A current supply and starting method, more particularly for the service on ground of aircraft equipped with turbo-machines or reciprocating engines driven by an electrical starter, by means of a starting generator driven by a starting engine, comprising, in succession, the steps of maintaining during the normal current supply period the speed of the starting engine at a speed lower than that for which the starting generator gives the power required for performing the starting operation, of simultaneously controlling the tension of the current supplied by the generator to have a constant tension, then, when the starting operation begins, of increasing the speed of the starting engine until said speed corresponds to that for which the starting generator gives the starting power, of controlling the current supplied by the generator to have a constant intensity equal to that necessary for performing the starting operation while the tension of said supply current at first decreases, then increases, and, when said tension attains a value equal to said constant value, of controlling the tension of the supplied current to said constant value.

2. A method, according to claim 1, wherein the shift of the starting engine from the reduced speed to the starting speed is caused by the current intensity passing from the supply value to the starting value.

3. A current supply and starting method, more particularly for the service on ground of aircraft equipped with turbo-machines or reciprocating engines driven by an electrical starter, by means of a starting generator driven by a starting engine, said starter having series winding comprising, in succession, the steps of maintaining during the normal current supply period the speed of the starting engine at a speed lower than that for which the starting generator gives the power required for performing the starting operation, of simultaneously controlling the tension of the current supplied by the generator to have a constant tension, then, when the starting operation begins, of increasing the speed of the starting engine until said speed corresponds to that for which the starting generator gives the starting power, of controlling the current supplied by the generator to have a constant intensity equal to that necessary for performing the starting operation while the tension of said supply current at first decreases, then increases, and, when the counterelectromotive force of the starter attains a value equal to that of said constant tension, of controlling the tension of the supplied current to said constant value.

4. A current supply and starting unit for internal combustion engines, more particularly for the service on ground of aircraft equipped with turbo-machines or reciprocating engines, comprising, in combination, a starting engine, a starting generator connected with said starting engine, an electrical starter supplied by said generator, a servicing line on the aircraft which may be connected to be supplied on ground by said generator, means for reducing during the period when the generator supplies current only to said servicing line, the speed of the starting engine at a speed lower than that for which said generator gives the power required for performing the starting operation, means for maintaining during said period the tension of the current supplied by the starting generator to a constant value, means for connecting the starter with the starting generator, means for eliminating said maintaining means at the beginning of the starting operation, means for simultaneously increasing the speed of the starting engine until said speed corresponds to that for which the starting generator gives the starting power, means for maintaining at the beginning and during the performing of the starting operation the current supplied by the generator to the starter to a constant intensity equal to that necessary for performing said starting operation, means for maintaining at the end of the starting operation, at a value equal to said constant tension value, the tension of the current supplied by said generator to the starter which tension increases at the beginning of the starting operation from a value less than said constant tension value, means for adjusting said constant current intensity, means for avoiding any return of current from the servicing line, and means for cutting the supplying of said starter.

5. A current supply and starting unit for internal combustion engines, more particularly for the service on ground of aircraft equipped with turbo-machines or reciprocating engines, comprising, in combination, a starting engine, a starting generator connected with said starting engine and having a shunt field coil, an electrical starter having a series winding, main leads connecting said starter with said starting generator, a servicing line on the aircraft which may be connected to be supplied on ground by said generator; a speed adjusting means constructed and arranged to set said starting engine on two different speeds, the lower one corresponding to the supplying of said servicing line and the greater one to the performing of the starting operation, means for controlling the adjustment of said speed adjusting means; an adjustable regulator connected in series with said shunt field coil, a device for modifying the adjustment of said regulator; a voltage pilot regulator connected with said device and acting for maintaining constant the tension of the current supplied by the generator to said servicing line only and at the end of the starting operation; an intensity pilot regulator connected with said device for maintaining the current supplied by the generator to the starter to a constant intensity equal to that necessary for performing the starting operation, and a resistance mounted in series in one of the main leads, said intensity pilot regulator having an operative coil connected in parallel to said resistance; means for substituting said intensity pilot regulator to said voltage pilot regulator at the beginning of the starting operation; a main contactor inserted in one of said main leads, means for closing said main contactor when said servicing line is to be supplied in current, a manually operated switch inserted in one of said main leads between said main contactor and said starter for controlling the latter, means for maintaining said main contactor in closed position during the supplying of said servicing line and during the performing of the starting operation; means for substituting said voltage pilot regulator to said intensity pilot regulator when the counter-electromotive force of the stater attains a value equal to that of said constant tension; means for previously adjusting said constant current intensity; means for avoiding any return of current from the servicing line into the unit, and means for cutting the supplying of said starter.

6. A current supply and starting unit, according to claim 5, wherein the speed adjusting means and the means for controlling the adjustment of said adjusting means comprise an intensity relay mounted in parallel on one of the main leads, a movable contact operatable by said intensity relay and connected with a source of current, a fixed contact associated with said movable contact, a core formed with a flange, a governor having a spring bearing on said flange, and a coil surrounding said core one end of which is connected with said fixed contact the other end of which being connected with said source of current.

7. A current supply and starting unit, according to claim 5, wherein the means for closing and maintaining the main contactor, for avoiding any return of current and for cutting the supplying of the starter comprise a coil for the main contactor connected in parallel between the main leads, a reverse current relay having a winding mounted in series in one of the main leads and a shunt winding connected in parallel on said main contactor coil, a normally open push-button switch inserted in series in one of the lines connecting the contactor coil with the main leads, a movable contact operatable by said reverse current relay, a fixed contact associated with said movable contact, and a normally closed push-button, said fixed contact, movable contact and normally closed push-button being mounted in parallel with said normally open push-button.

8. A current supply and starting unit, according to claim 5, wherein the means for previously adjusting the constant current intensity comprises a multiple tap rheostat having a resistor provided with multiple taps and connected in series with one end of the operative coil of the intensity pilot regulator, and a slider acting on the taps of said resistor and connected with the main lead with which said end of the operative coil is connected.

9. A current supply and starting unit, according to claim 5, wherein an adjustable resistance having multiple taps is connected in series with said operative coil of the intensity pilot regulator, said series connected adjustable resistance and operative coil being connected in parallel with the said resistance mounted in series in one of the main leads, and wherein the means for previously adjusting the constant current intensity comprises an adjusting switch acting on the taps of said adjustable resistance is connected in series with one end of said operative coil.

10. A current supply and starting unit for internal combustion engines, more particularly for the service on ground of aircraft equipped with turbo-machines or reciprocating engines, comprising, in combination, a starting engine, a starting generator connected with said starting engine and having a shunt field coil, an electrical starter having a series winding, main leads connecting said starter with said starting generator, a servicing line on the aircraft which may be connected to be supplied on ground by said generator; a speed adjusting means constructed and arranged to set said starting engine on two different speeds, the lower one corresponding to the supplying of said servicing line and the greater one to the performing of the starting operation, means for controlling the adjustment of said speed adjusting means; an adjustable regulator connected in series with said shunt field coil and having a pile of carbon discs, a compression and release device adapted to act on said discs, and a solenoid the armature of which is connected with said device; a circuit connecting said solenoid in parallel with the generator, a calibrating resistor mounted in series in said circuit, two tappings displaceable along said calibrating resistor; a voltage pilot regulator, an intensity pilot regulator, said voltage and intensity pilot regulators being respectively connected with said tappings; means for substituting said intensity pilot regulator to said voltage pilot regulator at the beginning of the starting operation; a main contactor inserted in one of said main leads, means for closing said main contactor when said servicing line is to be supplied in current, a manually operated switch inserted in one of said main leads between said main contactor and said starter for controlling the latter, means for maintaining said main contactor in closed position during the supplying of said servicing line and during the performing of the starting operation; means for substituting said voltage pilot regulator to said intensity pilot regulator when the counter-electromotive force of the starter attains a value equal to that of said constant tension; means for previously adjusting said constant current intensity; means for avoiding any return of current from the servicing line into the unit, and means for cutting the supplying of said starter.

11. A current supply and starting unit for internal combustion engines, more particularly for the service on ground of aircraft equipped with turbo-machines or reciprocating engines, comprising, in combination, a starting engine, a starting generator connected with said starting engine and having a shunt field coil, an electrical starter having a series winding, main leads connecting said starter with said starting generator, a servicing line on the aircraft which may be connected to be supplied on ground by said generator; a speed adjusting means constructed and arranged to set said starting engine on two different speeds, the lower one corresponding to the supplying of said servicing line and the greater one to the performing of the starting operation, means for controlling the adjustment of said speed adjusting means; an adjustable regulator connected in series with said shunt field coil and having a pile of carbon discs, a compression and release device adapted to act on said discs, and a solenoid the armature of which is connected with said device; a circuit connecting said solenoid in parallel with the generator, a calibrating resistor mounted in series in said circuit, two tappings displaceable along said calibrating resistor; a voltage pilot regulator of the vibrating contact type connected with one of said tappings, the vibrating contact of said voltage pilot regulator short-circuiting the part of the calibrating resistor comprised beyond said tappings; an intensity pilot regulator of the vibrating contact type connected with the second tapping, the vibrating contact of said intensity pilot regulator short-circuiting the part of the callibrating resistor comprised beyond said second tapping; means for substituting said intensity pilot regulator to said voltage regulator and reversely, at the beginning of the starting operation and when the counter-electromotive force of the starter attains the controlled value of the tension, respectively; a main contactor inserted in one of said main leads, means for closing said main contactor when said servicing line is to be supplied in current, a manually operated switch inserted in one of said main leads between said main contactor and said starter for controlling the latter, means for maintaining said main contactor in closed position during the supplying of said servicing line and during the performing of the starting operation; means for previously adjusting said constant current intensity; means for avoiding any return of current from the servicing line into the unit, and means for cutting the supplying of said starter.

12. A current supply and starting unit for internal combustion engines, more particularly for the service on ground of aircraft equipped with turbo-machines or reciprocating engines, comprising, in combination, a starting engine, a starting generator connected with said starting engine and having a shunt field coil, an electrical starter having a series winding, main leads connecting said starter with said starting generator, a servicing line on the aircraft which may be connected to be supplied on ground by said generator; a speed adjusting means constructed and arranged to set said starting engine on two different speeds, the lower one corresponding to the supplying of said servicing line and the greater one to the performing of the starting operation, means for controlling the adjustment of said speed adjusting means; an adjustable regulator having a pile of carbon discs connected in series with said shunt field coil, a lever one arm of which bears on one end of said pile, an armature carried by the second arm of said lever, a solenoid surrounding said armature and connected in parallel between said main leads, a spring connected with the second arm of said lever for pressing the pile in inoperative condition, a damping dash-pot connected at the end of said second arm for regularizing the compression on the pile, a frame for supporting all said elements, and strip springs respectively connecting said armature with said frame, said lever with said pile and said damping dash-pot, and said dash-pot with said frame; a calibrating resistor mounted in series in the circuit connecting said solenoid in parallel with the generator, two tappings displaceable along said calibrating resistor; a voltage pilot regulator having a vibrating contact connected with one of said tappings, a quick-break winding connected with one of said main leads, an operative coil connected with the same main lead through an adjustable resistor and with the other main lead; an intensity pilot regulator having a vibrating contact connected with the second tapping, a quick-break winding connected with the main lead with which the quick-break winding of the voltage pilot regulator is connected, and an operative coil mounted in parallel on the other main lead; each of said pilot regulators having a frame supporting the corresponding quick-break coil, strip springs connecting the corresponding vibrating contact with said frame, and an adjustable stop for limiting the movement of said vibrating contact; a main contactor inserted in one of said main leads, means for closing said main contactor when said servicing line is to be supplied in current, a manually operated switch inserted in one of said main leads between said main contactor and said starter for controlling the latter, means for maintaining said main contactor in closed position during the supplying of said servicing line and during the performing of the starting operation; means for previously adjusting said constant current intensity; means for avoiding any return of current from the servicing line into the unit, and means for cutting the supplying of said starter.

References Cited in the file of this patent

UNITED STATES PATENTS

| Number | Name | Date |
|---|---|---|
| 1,178,596 | Okey | Apr. 11, 1916 |
| 1,926,849 | Gray | Sept. 12, 1933 |
| 2,149,041 | Bradshaw et al. | Feb. 28, 1939 |
| 2,150,294 | Roosa et al. | Mar. 14, 1939 |
| 2,168,927 | Adams et al. | Aug. 8, 1939 |
| 2,175,851 | Pearce | Oct. 10, 1939 |
| 2,223,703 | Potez | Dec. 3, 1940 |
| 2,579,126 | Pielstik | Dec. 18, 1951 |
| 2,624,849 | Bennett-Powell | Jan. 6, 1953 |

FOREIGN PATENTS

| Number | Country | Date |
|---|---|---|
| 1,011,735 | France | Apr. 9, 1952 |